US008747127B2

(12) United States Patent
Zhou et al.

(10) Patent No.: US 8,747,127 B2
(45) Date of Patent: Jun. 10, 2014

(54) RECEPTACLE CONNECTOR

(75) Inventors: Zhi Yong Zhou, Guangzhou (CN); Yong Quan Wu, Guangzhou (CN); Jun Liu, Guangzhou (CN); Chang Wei Huang, Guangzhou (CN)

(73) Assignee: Lotes Co., Ltd., Keelung (TW)

( * ) Notice: Subject to any disclaimer, the term of this patent is extended or adjusted under 35 U.S.C. 154(b) by 169 days.

(21) Appl. No.: 13/604,385

(22) Filed: Sep. 5, 2012

(65) Prior Publication Data

US 2014/0004728 A1 Jan. 2, 2014

(30) Foreign Application Priority Data

Jul. 2, 2012 (CN) .................. 2012 2 0313603 U (51) Int. Cl.
| | |
|---|---|
| *H01R 13/44* | (2006.01) |
| *H01R 35/04* | (2006.01) |
| *H01R 24/00* | (2011.01) |
| *H01R 13/60* | (2006.01) |

(52) U.S. Cl.
CPC ............... *H01R 13/44* (2013.01); *H01R 35/04* (2013.01); *H01R 23/025* (2013.01); *H01R 13/60* (2013.01)
USPC ......................................... 439/131; 439/159

(58) Field of Classification Search
CPC ...... H01R 13/44; H01R 35/04; H01R 23/025; H01R 13/60; H01R 2201/06
USPC .................................................. 439/131, 159
See application file for complete search history.

(56) References Cited

U.S. PATENT DOCUMENTS

| | | | | |
|---|---|---|---|---|
| 5,015,200 | A | * | 5/1991 | Abernethy .................... 439/357 |
| 5,033,972 | A | * | 7/1991 | Komatsu et al. .............. 439/153 |
| 5,299,946 | A | * | 4/1994 | Kusakabe ..................... 439/159 |
| 5,481,656 | A | * | 1/1996 | Wakabayashi et al. ...... 358/1.16 |
| 5,692,208 | A | * | 11/1997 | Felcman et al. ......... 361/679.38 |
| 5,751,547 | A | * | 5/1998 | Honda et al. ............ 361/679.43 |
| 5,933,321 | A | * | 8/1999 | Ruch et al. .............. 361/679.42 |
| 6,033,244 | A | * | 3/2000 | Nishioka ....................... 439/159 |
| 6,056,566 | A | * | 5/2000 | Nakamura et al. ............ 439/159 |
| 6,059,597 | A | * | 5/2000 | Endo et al. .................... 439/352 |
| 6,065,993 | A | * | 5/2000 | Lai et al. ....................... 439/402 |
| 6,361,339 | B1 | * | 3/2002 | Zhang et al. .................. 439/160 |
| 6,370,608 | B2 | * | 4/2002 | Yamada et al. ............... 710/301 |
| 6,390,836 | B1 | * | 5/2002 | Motegi et al. ................. 439/159 |
| 6,485,690 | B1 | * | 11/2002 | Pfost et al. .................... 422/552 |
| 6,503,092 | B1 | * | 1/2003 | Sato .............................. 439/159 |
| 6,587,350 | B1 | * | 7/2003 | Lin et al. ....................... 361/754 |
| 6,743,030 | B2 | * | 6/2004 | Lin et al. ....................... 439/131 |
| 7,491,074 | B1 | * | 2/2009 | Lai ................................ 439/159 |
| 7,581,967 | B2 | * | 9/2009 | Collantes et al. ............. 439/131 |

(Continued)

*Primary Examiner* — Amy Cohen Johnson
*Assistant Examiner* — Vladimir Imas
(74) *Attorney, Agent, or Firm* — Morris Manning & Martin LLP; Tim Tingkang Xia, Esq.

(57) ABSTRACT

A receptacle connector includes a receiving slot, a mating plate slidably received in the receiving slot, an ejection mechanism, and a resetting mechanism. The mating plate is exposed at a front end of the receiving slot and is provided with a urging portion and a first engaging portion. The ejection mechanism is provided with a stopping portion for correspondingly stopping the urging portion, so that the ejection mechanism can drive the mating plate to slide outwards. The resetting mechanism is provided with a second engaging portion for being correspondingly engaged with the first engaging portion, so that the resetting mechanism can drive the mating plate to return to an original position.

13 Claims, 9 Drawing Sheets

(56) References Cited

U.S. PATENT DOCUMENTS

| | | | |
|---|---|---|---|
| 7,626,812 B2 * | 12/2009 | Chang et al. ............. 361/679.33 |
| 7,661,967 B2 * | 2/2010 | Tang et al. .................... 439/131 |
| 7,699,641 B2 * | 4/2010 | Bright et al. .................. 439/352 |
| 7,811,101 B2 * | 10/2010 | Tang et al. .................... 439/131 |
| 7,892,034 B2 * | 2/2011 | Maiterth et al. .............. 439/630 |
| 8,070,500 B2 * | 12/2011 | Li ................................. 439/159 |
| 8,147,262 B1 * | 4/2012 | Su et al. ........................ 439/159 |
| 8,287,293 B1 * | 10/2012 | Gao et al. ..................... 439/159 |
| 8,353,709 B2 * | 1/2013 | Tang et al. .................... 439/131 |
| 8,371,865 B1 * | 2/2013 | Su ................................. 439/155 |
| 8,460,020 B2 * | 6/2013 | Hsiao ............................ 439/159 |
| 8,500,466 B2 * | 8/2013 | Zhang et al. .................. 439/131 |
| 2005/0003711 A1 * | 1/2005 | Chang ........................... 439/630 |
| 2008/0278902 A1 * | 11/2008 | Nguyen et al. ............... 361/684 |
| 2009/0023319 A1 * | 1/2009 | Hou et al. ..................... 439/159 |

* cited by examiner

RECEPTACLE CONNECTOR

CROSS-REFERENCE TO RELATED APPLICATIONS

This non-provisional application claims priority under 35 U.S.C. §119(a) on Patent Application No. 201220313603.3 filed in P.R. China on Jul. 2, 2012, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to a receptacle connector, and more particularly to a receptacle connector matable to a plug connector.

BACKGROUND OF THE INVENTION

Figure 9:
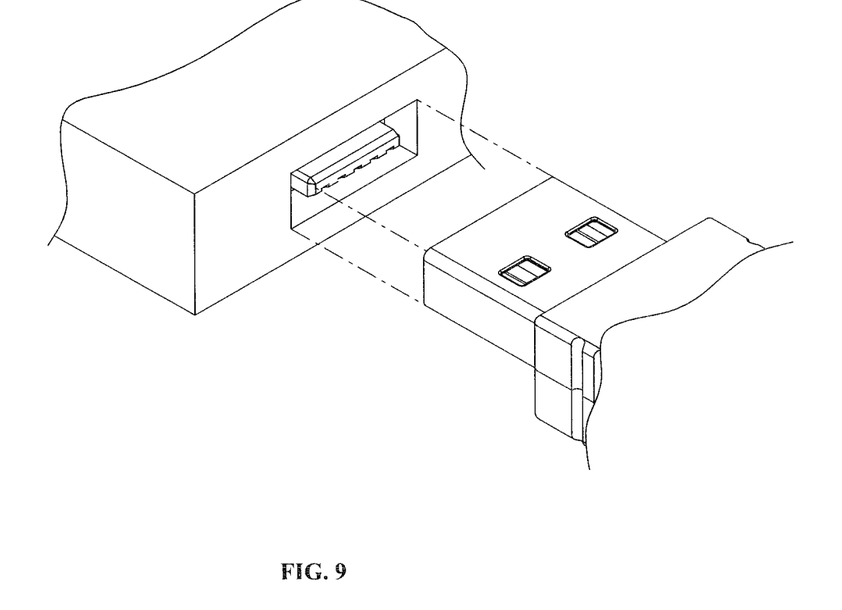
FIG. 9 is a schematic view of an existing receptacle connector and a corresponding plug connector.

Existing receptacle connectors, especially those disposed in a casing of an electronic device such as a notebook computer, are used for being matable to corresponding plug connectors. As shown in FIG. 9, to achieve mating, generally a receptacle connector is formed with an opening on the casing for mating, and the height of the opening is substantially equal to the thickness of a mating joint of the plug connector. Therefore, the overall thickness of the electronic device such as the notebook computer must be greater than the thickness of the mating joint, in order to install the plug connector therein to achieve electrical connection. Along with the development trend of electronic products towards lightweight and thin structures, the existing receptacle connector cannot meet the requirements for ultra-thin edges of notebook computers at present.

Therefore, a heretofore unaddressed need exists in the art to address the aforementioned deficiencies and inadequacies.

SUMMARY OF THE INVENTION

In one aspect, the present invention is directed to a receptacle connector having a retractable mating plate, which can meet the requirements for ultra-thin edges of notebook computers.

In one embodiment, a receptacle connector according to the present invention is used for a plug connector to be inserted therein. The receptacle connector includes an electrical connection base, an ejection mechanism, and a resetting mechanism. The electrical connection base has an upper surface recessed with a receiving slot for slidably receiving a mating plate, and the mating plate is exposed at a front end of the receiving slot. The ejection mechanism drives the mating plate to slide outwards. The resetting mechanism drives the mating plate to return to an original position. The ejection mechanism has an elastic restoring force greater than that of the resetting mechanism.

Further, the ejection mechanism and the resetting mechanism are disposed opposite to each other on two sides of the receiving slot, and the mating plate is disposed between the ejection mechanism and the resetting mechanism.

Further, the ejection mechanism includes a first elastic element, and the first elastic element has one end disposed on a rear wall of the receiving slot and the other end disposed on the ejection mechanism. The resetting mechanism includes a second elastic element, and the second elastic element has one end disposed on a front wall of the receiving slot and the other end disposed on the resetting mechanism.

Further, the mating plate is provided with a urging portion and a first engaging portion. The ejection mechanism is provided with a stopping portion, and the stopping portion stops the urging portion. The resetting mechanism is provided with a second engaging portion, and the second engaging portion is engaged with the first engaging portion.

Further, the urging portion is disposed on a rear end of the mating plate, a rear end of the ejection mechanism extends towards the inside of the receiving slot to form the stopping portion, and the stopping portion stops the urging portion.

Further, one side of the mating plate facing the resetting mechanism protrudes to form the first engaging portion, one side of the resetting mechanism facing the receiving slot is recessed to form the second engaging portion, and the second engaging portion is engaged with the first engaging portion.

Further, a front end of the mating plate is provided with a pressing portion, the ejection mechanism includes a first sliding block, the first sliding block extends forwards to form a reset block, and the reset block is substantially aligned with the pressing portion when the plug connector is not inserted.

Further, when the mating plate is pressed so that the ejection mechanism is disengaged, the stopping portion stops the urging portion, and the reset block slides outwards along with the mating plate. When the plug connector is inserted, the plug connector urges against the reset block so that the reset block returns to an original position.

Further, the resetting mechanism includes a second sliding block, and the second sliding block is integrally formed with the mating plate.

Further, after the mating plate slides outwards, the plug connector is mated to and wraps the mating plate.

Further, an elastic plate terminal is respectively disposed on two opposite side walls of the mating plate, and the receptacle connector includes a cover pivotally covering the mating plate. When the mating plate slides outwards, the elastic plate terminals pop the cover upwards, so that an accommodating space is formed between the cover and the mating plate, for the plug connector to be inserted therein.

Further, the electrical connection base includes a plurality of first terminals, the mating plate correspondingly receives a plurality of second terminals, and when the mating plate slides outwards, the first terminals are electrically conducted with the second terminals.

Further, a flexible printed circuit is disposed between the electrical connection base and the mating plate, and the flexible printed circuit enables the electrical connection base and the mating plate to maintain electrical conduction therebetween.

As compared with the related art, in the receptacle connector of the present invention, since the receiving slot slidably receives the mating plate, and the mating plate is exposed to the front end of the receiving slot, the plug connector is mated to the part of the mating plate protruding out of the casing so as to achieve electrical connection. In this way, the overall thickness of electronic devices such as notebook computers can be effectively reduced by simply setting the height of the opening of the receptacle connector on the casing to be substantially equal to the thickness of the mating plate. In addition, since the mating plate is provided with the urging portion and the first engaging portion, and the ejection mechanism is provided with the stopping portion for correspondingly stopping the urging portion, the ejection mechanism can drive the mating plate to slide outwards. And since the resetting mechanism is provided with the second engaging portion for being correspondingly engaged with the first engaging portion, the resetting mechanism can drive the mating plate to return to an original position. Therefore, the receptacle connector of the present invention meets the requirements for ultra-thin edges of electronic devices such as notebook computers, and is also easy to use yet novel.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

Figure 1:
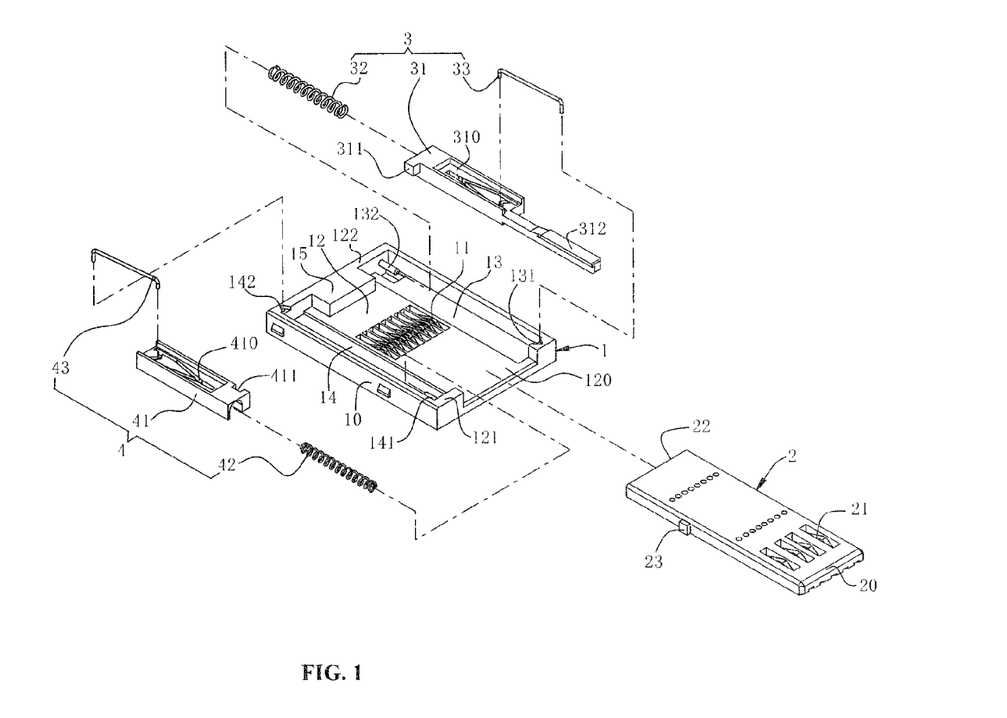
FIG. 1 is a three-dimensional exploded view of a receptacle connector according to one embodiment of the present invention.
Figure 2:
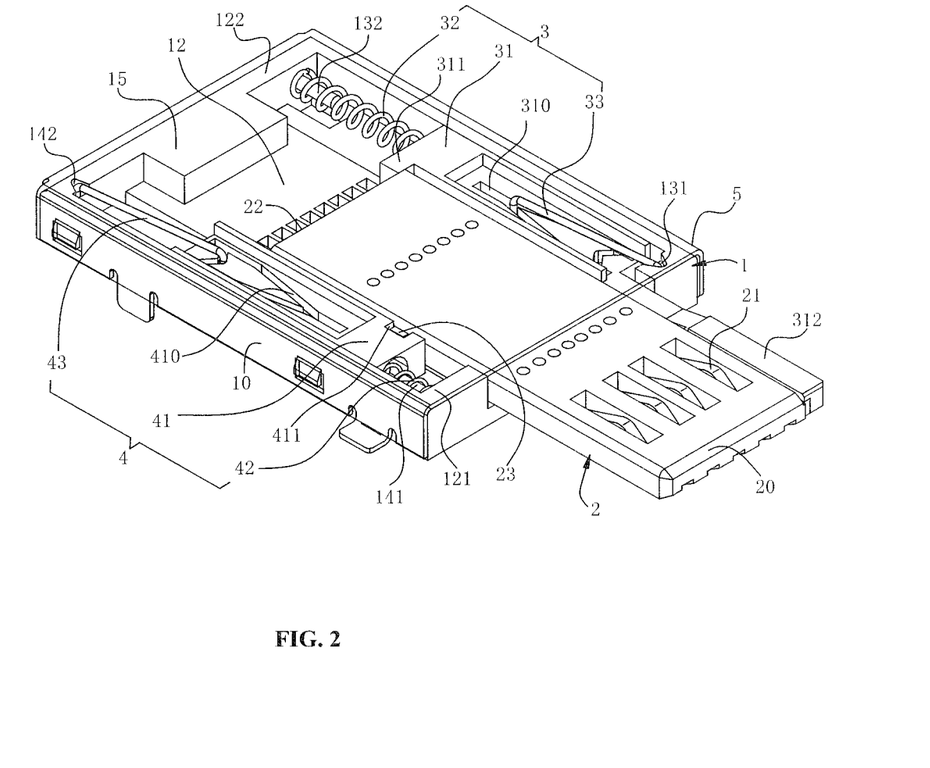
FIG. 2 is a three-dimensional assembled view of the receptacle connector according to one embodiment of the present invention.
Figure 3:
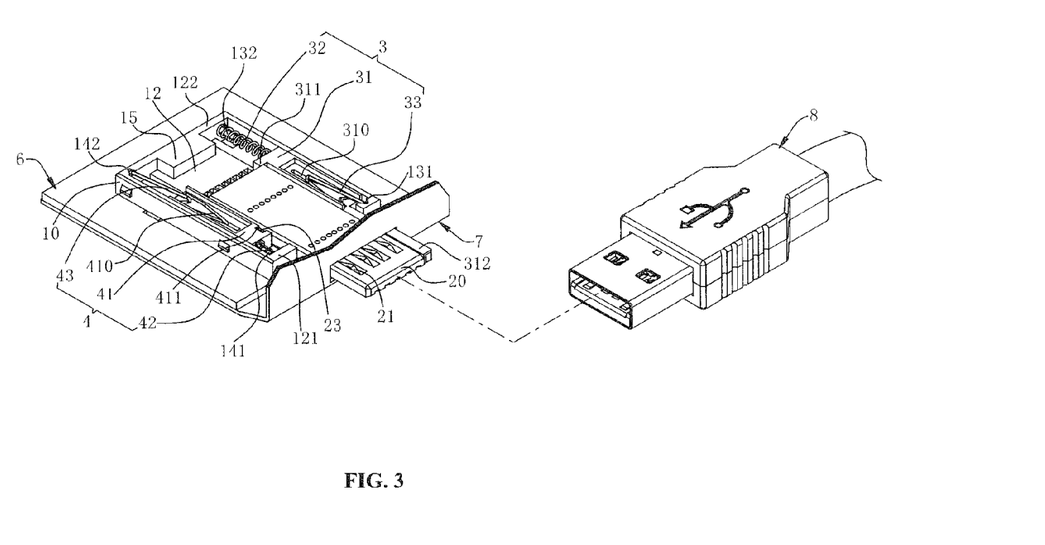
FIG. 3 is a schematic view of the receptacle connector according to one embodiment of the present invention and a plug connector mated thereto.

Referring to FIGS. 1-3, a receptacle connector according to one embodiment of the present invention includes an electrical connection base 1, a mating plate 2 (for example, a USB tongue plate), an ejection mechanism 3, a resetting mechanism 4 and a shell 5. The receptacle connector is fixed to a circuit board 6 by soldering and received in a casing 7 (for example, a casing of an electronic device such as a notebook computer), and is used for being matable to a plug connector 8 to achieve electrical conduction.

Referring to FIGS. 1-3, the electrical connection base 1 includes a base body 10 and a plurality of first terminals 11 received in the base body 10. The base body 10 is of a rectangular shape and is recessed with a receiving slot 12 on an upper surface thereof, and a first sliding slot 13 and a second sliding slot 14 in communication with the receiving slot 12 are recessed on two opposite sides of the receiving slot 12 respectively. A front wall 121 and a rear wall 122 are respectively defined at the other two opposite sides of the receiving slot 12. An opening 120 is formed substantially at a middle part of the front wall 121 to communicate the receiving slot 12 with the outside. The rear wall 122 extends towards the inside of the receiving slot 12 to form a stopping block 15, where the stopping block 15 is of a square shape and is integrally formed with the base body 10. In the first sliding slot 13, the front wall 121 is recessed with a first fastening slot 131, and the rear wall 122 protrudes to form a first positioning post 132. In the second sliding slot 14, the front wall 121 protrudes to form a second positioning post 141, and the rear wall 122 is recessed with a second fastening slot 142. The first fastening slot 131 and the second fastening slot 142 are substantially located on a diagonal of the base body 10, and the first positioning post 132 and the second positioning post 141 are substantially located on the other diagonal of the base body 10.

Referring to FIG. 1, the mating plate 2 further includes a plurality of second terminals 21 received therein. The mating plate 2 is provided on a front end thereof with a pressing portion 20 (with a front end surface of the mating plate 2 being the pressing portion 20), is provided on a rear end thereof with a urging portion 22 (with a rear end surface of the mating plate 2 being the urging portion 22), and protrudes from one side thereof to form a first engaging portion 23.

Referring to FIGS. 1 and 2, the ejection mechanism 3 includes a first sliding block 31, a first elastic element 32 and a first catch member 33, and the resetting mechanism 4 includes a second sliding block 41, a second elastic element 42 and a second catch member 43. Both the ejection mechanism 3 and the resetting mechanism 4 are card ejection mechanisms commonly used in a card connector. Upper surfaces of the first sliding block 31 and the second sliding block 41 are respectively recessed with a first guide groove 310 and a second guide groove 410. A rear end of the first sliding block 31 extends towards the inside of the receiving slot 12 to form a stopping portion 311, and the other end extends forwards (or outwards) to form a reset block 312. The second sliding block 41 is recessed with a second engaging portion 411 facing the receiving slot 12. In this embodiment, the first elastic element 32 and the second elastic element 42 are springs, and the first elastic element 32 has an elastic restoring force greater than that of the second elastic element 42. In other embodiments, the first elastic element 41 and the second elastic element 42 may be other elements having a certain elastic restoring force.

In this embodiment, the first catch member 33 and the second catch member 43 are pull rods, and two ends of the first catch member 33 and two ends of the second catch member 43 are substantially bent perpendicularly into hook shapes respectively.

Referring to FIGS. 1-3, during assembly, first, the mating plate 2 is slidably received in the receiving slot 12, and is limited by the stopping block 15. Then, the ejection mechanism 3 and the resetting mechanism 4 are respectively disposed in the first sliding slot 13 and the second sliding slot 14. That is, one end of the first elastic element 32 is sleeved on and fixed to the first positioning post 132, and the other end is received in and fixed to the first sliding block 31. Meanwhile, one end of the first catch member 33 is fastened to the first fastening slot 131, and the other end is engaged with and locked to an inner wall of the first guide groove 310. The first sliding block 31 needs to be disposed so that the stopping portion 311 stops the urging portion 22, and the reset block 312 is substantially aligned with the pressing portion 20. Likewise, one end of the second elastic element 42 is sleeved on and fixed to the second positioning post 141, and the other end is received in and fixed to the second sliding block 41. One end of the second catch member 43 is fastened to the second fastening slot 142, and the other end is movably disposed in the second guide groove 410. In addition, the second sliding block 41 needs to be disposed so that the first engaging portion 23 is engaged with the second engaging portion 411. In an initial state (that is, when the receptacle connector is not being used), the first elastic element 32 is in a compressed state and the first catch member 33 is in an engaged and locked state, while the second elastic element 42 is in a released state (or a slightly compressed state) and the second catch member 43 is in an unlocked state (that is, a state of being slidable in the second guide groove 410). In other embodiments, the second sliding block 41 may be integrally formed with the mating plate 2, and slidably received in the receiving slot 12.

Referring to FIGS. 1-3, afterwards, the shell 5 is engaged with and covered above the base body 10 to protect internal structures. Finally, the assembled receptacle connector is fixed to the circuit board 6 by soldering, and received in the casing 7 as a whole. When the receptacle connector is not being used, the mating plate 2 is always received in the receiving slot 12. Specifically, the mating plate 2 (for example, a tongue plate of a USB receptacle connector) is concealed in the casing 7 (for example, a casing of an electronic device such as a notebook computer), with only the pressing portion 20 and the reset block 312 being exposed, so as to facilitate force application before use.

Figure 4:
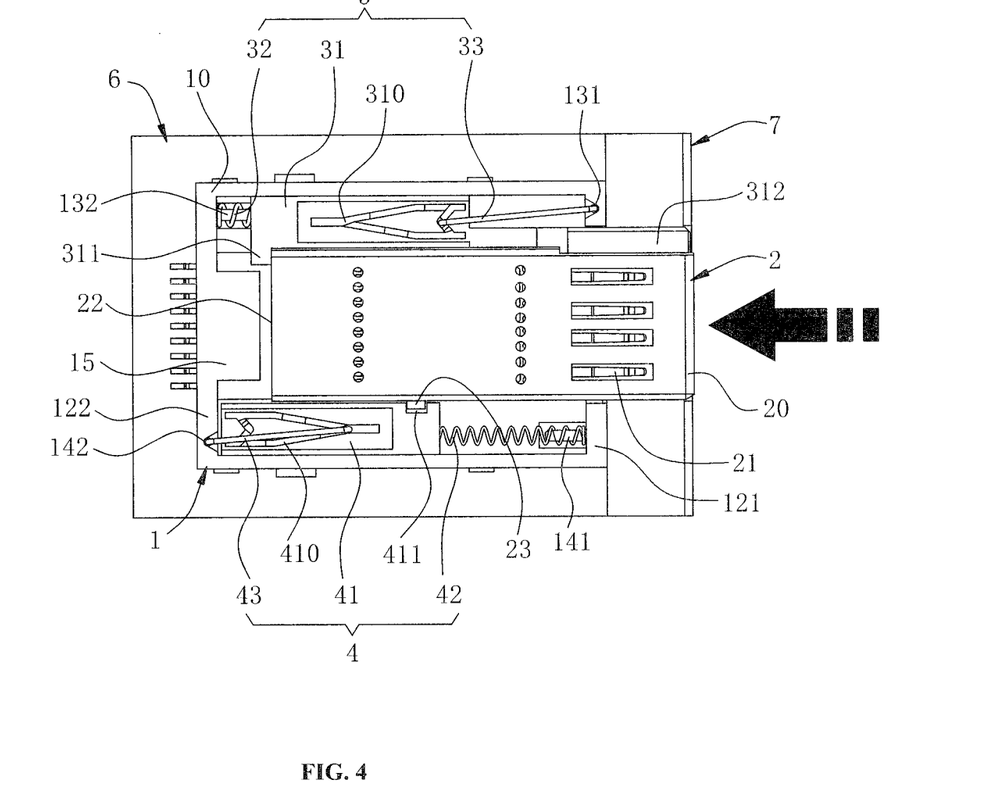
FIG. 4 is a state diagram illustrating that a force is to be applied to a mating plate of the receptacle connector according to one embodiment of the present invention.

Referring to FIGS. 1, 3 and 4, when it is intended to insert the plug connector 8, it only needs to apply a force to the pressing portion 20 (for example, press the pressing portion 20 with a hand), to disengage the first catch member 33, so that the first elastic element 32 is released (under the elastic restoring force thereof) to drive the first sliding block 31 to move outwards. The stopping portion 311 pushes the urging portion 22 so that the mating plate 2 moves outwards until the mating part slides out of the casing 7, and meanwhile, the reset block 312 also slides out of the casing 7 in alignment with the mating plate 2. At this time, electrical conduction is achieved between the first terminals 11 and the second terminals 21. Since the second engaging portion 411 is always engaged with the first engaging portion 23, and the second catch member 43 draws the second sliding block 41 so that the resetting mechanism 4 fastens and limits the mating plate 2, the mating plate 2 will not lose the mating function due to excessive sliding. In other embodiments, a flexible printed circuit (not shown) may be additionally disposed between the electrical connection base 1 and the mating plate 2, and the flexible printed circuit (not shown) enables the electrical connection base 1 and the mating plate 2 to maintain electrical conduction therebetween.

Figure 5:
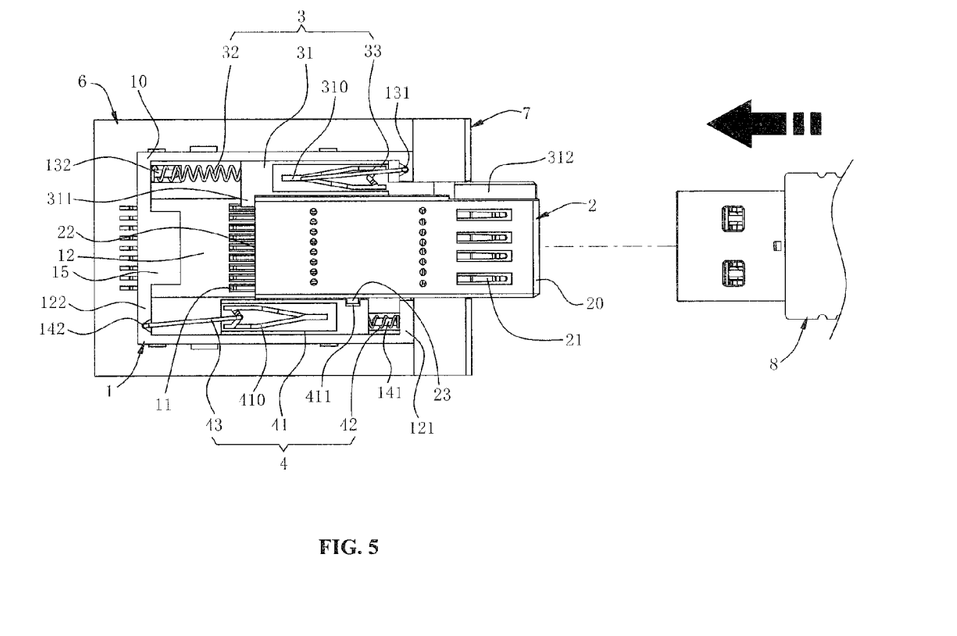
FIG. 5 is a state diagram illustrating that the mating plate of the receptacle connector according to one embodiment of the present invention slides out for the plug connector to be inserted therein.
Figure 6:
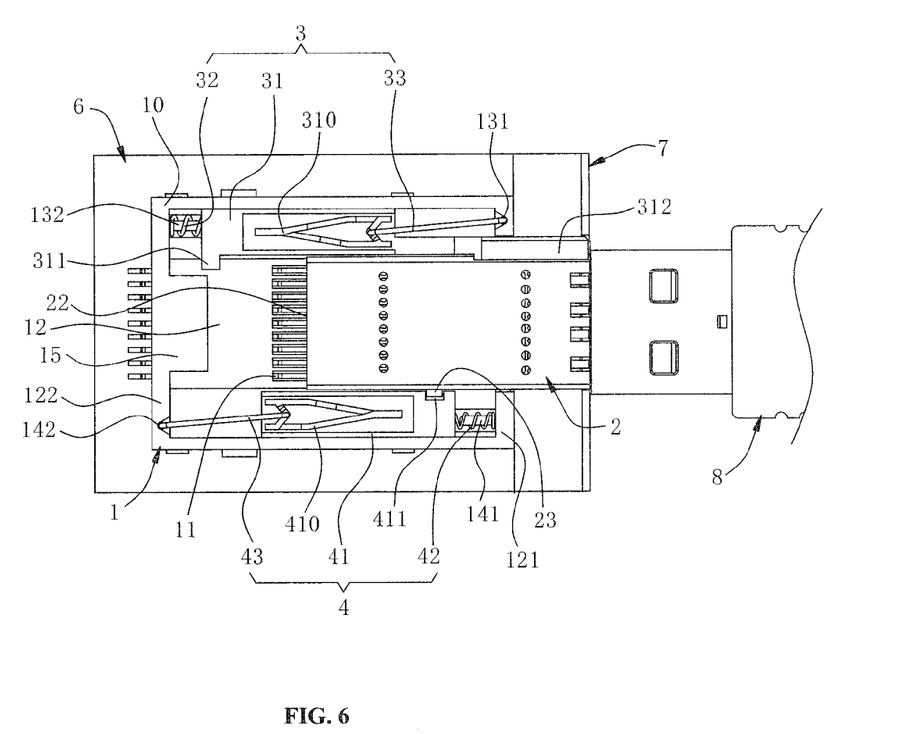
FIG. 6 is a state diagram illustrating that the receptacle connector according to one embodiment of the present invention is mated to the plug connector.

Referring to FIG. 4-6, when the plug connector 8 is inserted, the reset block 312 is urged by a mating joint of the plug connector 8 back into the casing 7, that is, the first sliding block 31 returns to an original position. During the whole insertion process, the mating plate 2 will not move backwards due to the engagement with the resetting mechanism 4, that is, one end of the second catch member 43 is fastened to the second fastening slot 142, and the other end is engaged with and stopped by the second guide groove 410, so that the whole resetting mechanism 4 is in a locked state. Further, since the first engaging portion 23 is engaged with the second engaging portion 411, the resetting mechanism 4 can stop the mating plate 2 (from moving backwards). In addition, when the plug connector 8 is mated to the mating plate 2, the mating joint of the plug connector 8 completely wraps the mating plate 2 so as to achieve electrical conduction. From another perspective, the receptacle connector (for example, a USB) extends to form the mating plate 2 (for example, a tongue plate), and the mating plate 2 is mated to and completely wrapped by the plug connector 8, which may be construed as that a receptacle connector extends to form a male end, and the male end is mated to a female end (that is, the plug connector 8) to achieve electrical conduction. Thus, the requirements for ultra-thin edges of electronic devices such as notebook computers are met.

Figure 7:
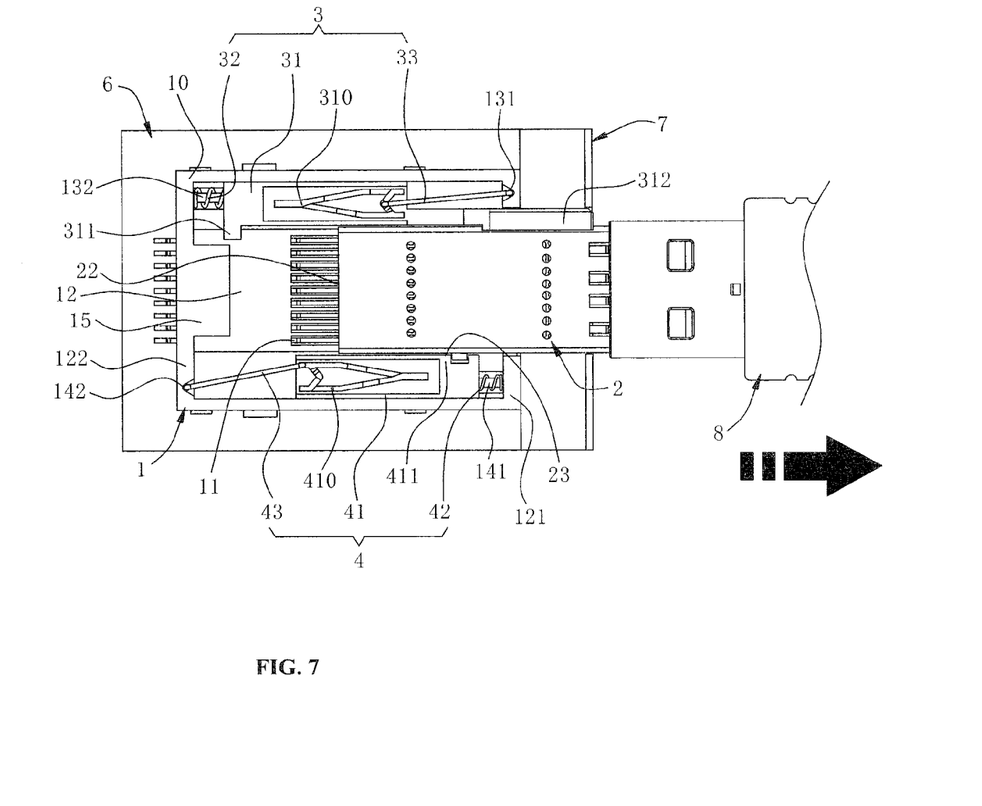
FIG. 7 is a state diagram illustrating that the plug connector is to be removed from the receptacle connector according to one embodiment of the present invention.
Figure 8:
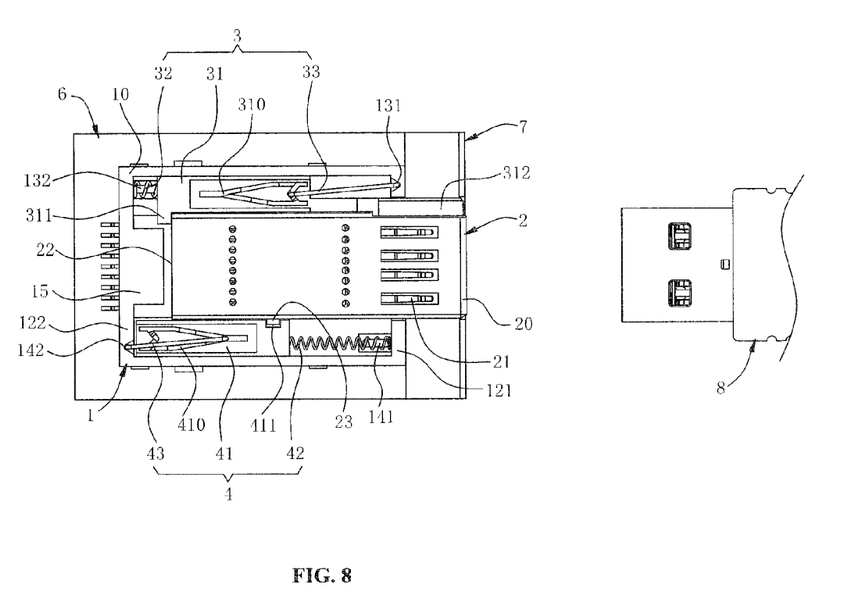
FIG. 8 is a state diagram illustrating that the receptacle connector according to one embodiment of the present invention is completely detached from the plug connector.

Referring to FIGS. 7 and 8, when the plug connector 8 is removed, since a certain retention force exists between the mating plate 2 and the plug connector 8, the mating plate 2 slightly moves outwards under the retention force, and meanwhile, the first sliding block 31 also slightly moves outwards due to the friction with the mating plate 2, so that the first catch member 33 urges against and is locked in the first guide groove 310 to return to an original state (that is, the ejection mechanism 3 is in a locked state). In addition, since the first engaging portion 23 is always engaged with the second engaging portion 411, the mating plate 2 slightly moves outwards, that is, slightly pulls the second sliding block 41 outwards, so that the second catch member 43 enters a restoring path in the second guide groove 410 (that is, the second catch member 43 is disengaged). When the plug connector 8 is completely detached from the mating plate 2, the second elastic element 42 is released under the elastic restoring force thereof to drive the second sliding block 41 to move backwards, and since the first engaging portion 23 is always engaged with the second engaging portion 411, the second sliding block 41 can drive the mating plate 2 to return to an original position (that is, the mating plate 2 is concealed in the casing 7 again).

In another embodiment, the receptacle connector further includes a cover (not shown). The cover is pivotally covered above the mating plate 2. An elastic plate terminal (not shown) is respectively disposed on two side walls of the mating plate 2. The two elastic plate terminals urge against an inner side surface of the cover. When the receptacle connector is not being used, the cover is buckled above the mating plate 2 and received in the casing 7 (that is, both the mating plate 2 and the cover are concealed in the casing 7, and are only exposed at a front end of the receiving slot 12). When it is intended to insert the plug connector 8 (for example, RJ45), a force needs to be applied to the mating plate 2, so that the mating plate 2 is driven by the ejection mechanism 3 to be ejected out of the casing 7. At this time, the cover is opened by a certain angle under elastic restoring forces of the two elastic plate terminals, so that an accommodating space (not shown) is formed between the cover and the mating plate 2, for the plug connector 8 (for example, RJ45) to be inserted therein.

Based on the above, the receptacle connector of the present invention, among other things, has the following beneficial effects.

1. Since the receiving slot 12 slidably receives the mating plate 2, and the mating plate 2 is exposed to the front end of the receiving slot 12, the plug connector 8 is mated to the part of the mating plate 2 protruding out of the casing 7 so as to achieve electrical connection. In this way, the overall thickness of electronic devices such as notebook computers can be effectively reduced by simply setting the height of the opening of the receptacle connector on the casing 7 to be substantially equal to the thickness of the mating plate 2.

2. Since the first elastic element 32 has one end disposed on the first positioning post 132 of the rear wall surface of the receiving slot 12 and the other end disposed on the first sliding block 31, and the second elastic element 42 has one end disposed on the second positioning post 141 located on the front wall surface of the receiving slot 12 and the other end disposed on the second sliding block 41, the ejection mechanism 3 and the resetting mechanism 4 are arranged in opposite directions, so that the ejection mechanism 3 can drive the mating plate 2 to slide outwards, and the resetting mechanism 4 can drive the mating plate 2 to return to the original position. Therefore, the receptacle connector of the present invention not only meets the requirements for ultra-thin edges of electronic devices such as notebook computers, but is also easy to use.

3. Since the first elastic element 32 has an elastic restoring force greater than that of the second elastic element 42, the first elastic element 32 can overcome the second elastic element 42 only when a force is applied to the mating plate 2, so that the ejection mechanism 3 drives the mating plate 2 to slide outwards for ease of mating to the plug connector 8.

4. Since the urging portion 22 is disposed on the rear end of the mating plate 2, and the rear end of the ejection mechanism 3 extends towards the inside of the receiving slot 12 to form the stopping portion 311 for correspondingly stopping the urging portion 22, the ejection mechanism 3 can drive the mating plate 2 to slide outwards for ease of mating to the plug connector 8, when the mating plate 2 is pressed.

5. Since one side of the mating plate 2 facing the resetting mechanism 4 protrudes to form the first engaging portion 23, and one side of the resetting mechanism 4 facing the receiving slot 12 is recessed to form the second engaging portion 411 for being correspondingly engaged with the first engaging portion 23, the mating plate 2, when being ejected out of the casing 7, is limited by the resetting mechanism 4 from being ejected excessively to affect the electrical connection.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A receptacle connector, for a plug connector to be inserted therein, comprising:
   an electrical connection base, having an upper surface recessed with a receiving slot for slidably receiving a mating plate, wherein the mating plate is exposed at a front end of the receiving slot;
   an ejection mechanism, for driving the mating plate to slide outwards; and
   a resetting mechanism, for driving the mating plate to return to an original position,
   wherein the ejection mechanism has an elastic restoring force greater than that of the resetting mechanism.

2. The receptacle connector according to claim 1, wherein the ejection mechanism and the resetting mechanism are disposed opposite to each other on two sides of the receiving slot, and the mating plate is disposed between the ejection mechanism and the resetting mechanism.

3. The receptacle connector according to claim 1,
   wherein the ejection mechanism comprises a first elastic element, and the first elastic element has one end disposed on a rear wall of the receiving slot and the other end disposed on the ejection mechanism; and
   wherein the resetting mechanism comprises a second elastic element, and the second elastic element has one end disposed on a front wall of the receiving slot and the other end disposed on the resetting mechanism.

4. The receptacle connector according to claim 1,
   wherein the mating plate is provided with a urging portion and a first engaging portion;
   wherein the ejection mechanism is provided with a stopping portion, and the stopping portion stops the urging portion; and
   wherein the resetting mechanism is provided with a second engaging portion, and the second engaging portion is engaged with the first engaging portion.

5. The receptacle connector according to claim 4, wherein the urging portion is disposed on a rear end of the mating plate, a rear end of the ejection mechanism extends towards the inside of the receiving slot to form the stopping portion, and the stopping portion stops the urging portion.

6. The receptacle connector according to claim 4, wherein one side of the mating plate facing the resetting mechanism protrudes to form the first engaging portion, one side of the resetting mechanism facing the receiving slot is recessed to form the second engaging portion, and the second engaging portion is engaged with the first engaging portion.

7. The receptacle connector according to claim 1, wherein a front end of the mating plate is provided with a pressing portion, the ejection mechanism comprises a first sliding block, the first sliding block extends forwards to form a reset block, and the reset block is substantially aligned with the pressing portion when the plug connector is not inserted.

8. The receptacle connector according to claim 7, wherein
   when the mating plate is pressed so that the ejection mechanism is disengaged, the stopping portion stops the urging portion, and the reset block slides outwards along with the mating plate; and
   when the plug connector is inserted, the plug connector urges against the reset block so that the reset block returns to an original position.

9. The receptacle connector according to claim 1, wherein the resetting mechanism comprises a second sliding block, and the second sliding block is integrally formed with the mating plate.

10. The receptacle connector according to claim 1, wherein after the mating plate slides outwards, the plug connector is mated to and wraps the mating plate.

11. The receptacle connector according to claim 1, wherein an elastic plate terminal is disposed on each of the two opposite side walls of the mating plate, the receptacle connector comprises a cover pivotally covering the mating plate, and when the mating plate slides outwards, the elastic plate terminals pop the cover upwards, so that an accommodating space is formed between the cover and the mating plate, for inserting the plug connector.

12. The receptacle connector according to claim 1, wherein the electrical connection base comprises a plurality of first terminals, the mating plate correspondingly receives a plurality of second terminals, and when the mating plate slides outwards, the first terminals are electrically conducted with the second terminals.

13. The receptacle connector according to claim 1, wherein a flexible printed circuit is disposed between the electrical connection base and the mating plate, and the flexible printed circuit enables the electrical connection base and the mating plate to maintain electrical conduction therebetween.

* * * * *